United States Patent
Barroso et al.

(10) Patent No.: US 10,711,151 B2
(45) Date of Patent: Jul. 14, 2020

(54) COLORED LEAD OR COLORED CHALK, PENCIL CONTAINING A COLORED LEAD, AND PROCESS FOR PREPARING A COLORED LEAD OR COLORED CHALK

(71) Applicant: FABER-CASTELL AG, Stein (DE)

(72) Inventors: Vladimir Barroso, Sao Carlos (BR); Eder D. J. Merola, Sao Carlos (BR); Marcel Prado Atassio, Sao Carlos (BR); Reiner Appel, Oberasbach (DE); Gerhard Lugert, Nuremberg (DE)

(73) Assignee: Faber-Castell AG, Stein (DE)

( * ) Notice: Subject to any disclaimer, the term of this patent is extended or adjusted under 35 U.S.C. 154(b) by 0 days.

(21) Appl. No.: 16/148,062

(22) Filed: Oct. 1, 2018

(65) Prior Publication Data
US 2019/0100673 A1   Apr. 4, 2019

(30) Foreign Application Priority Data
Sep. 29, 2017 (EP) .................... 17194226

(51) Int. Cl.
| C09D 13/00 | (2006.01) |
| B43K 19/00 | (2006.01) |
| B43K 19/02 | (2006.01) |
| B43K 19/18 | (2006.01) |

(52) U.S. Cl.
CPC ............ C09D 13/00 (2013.01); B43K 19/003 (2013.01); B43K 19/02 (2013.01); B43K 19/18 (2013.01)

(58) Field of Classification Search
CPC ..................................................... C09D 13/00
See application file for complete search history.

(56) References Cited

U.S. PATENT DOCUMENTS

| 5,595,589 | A | 1/1997 | Hoshiba et al. |
| 5,733,482 | A | 3/1998 | Hoshiba |
| 6,262,143 | B1 * | 7/2001 | Leidner .................. C09D 13/00 523/164 |
| 9,856,387 | B2 * | 1/2018 | Banzai .................. B43K 19/02 |
| 2003/0000420 | A1 | 1/2003 | Satoh |
| 2006/0020055 | A1 | 1/2006 | Krasnikov et al. |

FOREIGN PATENT DOCUMENTS

| DE | 19611985 A1 | 10/1996 |
| EP | 0697447 A1 | 2/1996 |
| EP | 1624036 A1 | 2/2006 |
| EP | 3112430 A1 | 1/2017 |
| JP | 2002265846 A | 9/2002 |
| JP | 2002302633 A | 10/2002 |
| JP | 2015227426 A | 12/2015 |

* cited by examiner

*Primary Examiner* — Helene Klemanski
(74) *Attorney, Agent, or Firm* — Laurence A. Greenberg; Werner H. Stemer; Ralph E. Locher

(57) ABSTRACT

A colored lead for writing, drawing and coloring implements, more particularly erasable, sintered colored lead, or to a colored chalk, more particularly erasable, sintered colored chalk, having a sintered lead or chalk base body which is formed from a lead or chalk base material containing at least one binder with a proportion of from 1 to 25% by weight and at least one filler with a proportion of from 25 to 99% by weight. The sintered lead or chalk base body is impregnated with at least one colorant and at least one lubricant.

20 Claims, No Drawings

COLORED LEAD OR COLORED CHALK, PENCIL CONTAINING A COLORED LEAD, AND PROCESS FOR PREPARING A COLORED LEAD OR COLORED CHALK

CROSS-REFERENCE TO RELATED APPLICATION

This application claims the priority, under 35 U.S.C. § 119, of German application EP 17194226.1, filed Sep. 29, 2017; the prior application is herewith incorporated by reference in its entirety.

BACKGROUND OF THE INVENTION

Field of the Invention

The invention relates to colored lead, more particularly an erasable, sintered colored lead, for writing, drawing or coloring implements or to colored chalk, more particularly an erasable, sintered colored chalk, to a pencil containing a colored lead and to a process for preparing a colored lead or colored chalk.

To achieve erasability in the case of colored leads or colored chalks, it is, for example, known to integrate plastic particles into the colored lead or colored chalk, which particles are colored with the particular lead color and which particles, when a stroke is made, then adhere to the paper surface such that they are removable using a rubber eraser. For example, published, European patent application EP 3 112 430 A1 (corresponding to U.S. Pat. No. 9,856,387) discloses a colored lead which contains a resin in which a dye is dissolved or included.

European patent EP 1 624 036 B1 describes unfired colored leads which contain alginates as binders, which adhere less strongly to the paper surface than other binders and thereby improve the erasability of the stroke. To prepare the colored leads, all starting materials are mixed, extruded to form lead strands and then dried at temperatures between 60 and 120° C. However, strokes made using such colored leads are less intense in color. Moreover, a further improvement in the erasability of the strokes is also desirable.

SUMMARY OF THE INVENTION

It is an object of the invention to propose a colored lead or colored chalk which exhibits a high color intensity, more particularly with good erasability. It is further an object of the invention to specify a process for preparing a colored lead or colored chalk and to specify a pencil containing a colored lead.

DETAILED DESCRIPTION OF THE INVENTION

The first-mentioned object is achieved with a colored lead for writing, drawing and coloring implements, more particularly an erasable, sintered colored lead, or a colored chalk, more particularly an erasable, sintered colored chalk. The colored lead or colored chalk contains a sintered lead or chalk base body which is formed from a lead or chalk base material containing at least one binder with a proportion of from 1 to 25% by weight and at least one filler with a proportion of from 25 to 99% by weight. The sintered lead or chalk base body is impregnated with at least one colorant and at least one lubricant or one fatty or waxy substance or the colorant and the lubricant are introduced into or embedded in the sintered lead or chalk base body, the sintered lead or chalk base body being successively impregnated with the colorant and the lubricant. To this end, the colorant is dissolved in a solvent.

In this connection, the specified proportions of the binder and of the filler are based on the proportions present in the lead or chalk base material, i.e., reflect the proportions of the starting materials used to prepare the sintered lead or chalk base body and thus correspond to the proportions in the unsintered lead or chalk base body.

The composition of the starting materials for the sintered lead or chalk base body of the colored leads or colored chalks according to the invention can thus be specified as follows:

| i) | Binder(s) | 1 to 25% by weight |
| ii) | Filler(s) | 25 to 99% by weight. |

The colored lead or colored chalk is thus obtained by a sintered lead or chalk base body having a porous structure being prepared from a lead or chalk base material containing at least the filler and the binder. This is essentially done by mixing the starting materials, extruding the lead or chalk base material to form lead or chalk strands, and drying and sintering the extruded lead or chalk strands. Subsequently, in separate steps, the colorant and the lubricant are introduced into the pores of the lead or chalk base body by impregnation, more particularly by immersion of the sintered lead or chalk base body into the impregnating agent, i.e., the colorant or the lubricant or solutions containing them respectively. The colorant and the lubricant are thus only introduced later into the already sintered lead or chalk base body, and as a result, damage to the colorant and the lubricant due to the high temperatures during the sintering process is prevented and the preparation of a fired colored lead is made possible.

At the same time, the present colored lead or colored chalk additionally offers the advantage that a standardized, sintered base body of the colored lead or colored chalk is first provided. By selecting the colorant and the lubricant, it is then possible to adjust the property profile of the colored lead or colored chalk. In the simplest case, it is possible here to vary the color of the colored leads or colored chalks, with the result that colored leads which are differently colored can be generated from the same base bodies. This distinctly reduces the complexity in the preparation of the colored leads, since only different compositions of impregnating agents need to be provided; the preparation of the base body can, however, be done in a standardized manner. The colored leads or colored chalks are suitable for writing, drawing and coloring on white, black and colored paper.

For the sake of simplicity, reference is predominantly made below to a colored lead, but the embodiments also equally apply to a colored chalk.

Preferably, boron nitride and/or a mineral filler, more particularly kaolin and/or talc and/or calcium carbonate and/or pumice powder, and/or clay are present in the lead or chalk base material as fillers.

In one of its modifications ("α-boron nitride"), boron nitride has a hexagonal crystal structure which is structurally comparable with graphite. Adding boron nitride as filler can positively influence erasability, and this may possibly be attributed to boron nitride generating, owing to its layered structure, a layered stroke which prevents or at least reduces a deep penetration of the colorants into the writing or drawing pad. It was thus possible to establish that the sintered colored leads or colored chalks which contain boron nitride as filler exhibit properties comparable with conventional fired graphite leads of hardness B with respect to stroke behavior, erasability, sharpenability, abrasion resistance and breaking strength.

A good erasability can be achieved in particular when boron nitride is present in the lead or chalk base material as filler with a proportion of not more than 90% by weight, more particularly with a proportion of not more than 82% by weight, particularly preferably with a proportion of not more than 75% by weight. Moreover, it is in particular also possible to adjust the mechanical strength and the softness of the colored lead via the content of boron nitride. The higher the proportion of boron nitride, the softer the lead.

The mineral filler is advantageously present in the lead or chalk base material with a proportion of not more than 90% by weight, more particularly with a proportion of not more than 82% by weight, particularly preferably with a proportion of not more than 75% by weight.

The clay is preferably present in the lead or chalk base material with a proportion of from 1 to 60% by weight, more particularly with a proportion of from 1 to 50% by weight, particularly preferably with a proportion of from 1 to 45% by weight. Owing to the mineral filler and the clay, it is possible to further increase or stabilize the mechanical strength and hardness of the lead while maintaining sufficient color intensity and good erasability. Moreover, owing to the use of these fillers, it is possible to reduce costs.

The colored lead, more precisely the lead or chalk base material, preferably contains altogether at least 50% by weight of fillers. More particularly, fillers are altogether present in the lead or chalk base material with a proportion of at least 65% by weight, particularly preferably with a proportion of at least 80% by weight.

In the lead or chalk base material, the at least one binder is more particularly present with a proportion of from 3 to 20% by weight, particularly preferably with a proportion of from 4 to 17% by weight. Possible binders are organic materials, for example cellulose or cellulose derivatives, alginates or else polyvinyl alcohols. Owing to the binder, it is possible, inter alia, to achieve a better processability of the lead or chalk base material and also a better shaping of the lead or chalk base bodies. Owing to the content of binder, it is possible in particular to ensure the mechanical strength of the crude leads or of the lead base bodies formed from the lead base material prior to the sintering procedure. The binder is not present or is hardly present in the sintered lead base bodies, since this is virtually completely decomposed as a result of the high temperatures during the sintering process. Furthermore, it is possible via the binder to adjust the porosity relevant to the impregnation procedure or to adjust a size or extent of the pores of the sintered lead base bodies, wherein the stated proportion has been found to be particularly advantageous.

In summary, the following composition can be specified as the formulation for the lead or chalk base material for preparing the sintered lead or chalk base body:

| | |
|---|---|
| Mineral filler | 0 to 90% by weight |
| Clay | 1 to 60% by weight |
| Boron nitride | 0 to 90% by weight |
| Binder | 1 to 25% by weight. |

The colorant, i.e., the at least one colorant or the sum of all colorants present, is preferably present in the colored lead or colored chalk with a proportion of from 0.1 to 10% by weight, more particularly with a proportion of from 0.5 to 7% by weight, particularly preferably with a proportion of from 0.8 to 5% by weight. Here, the proportion of the colorant is thus based on the proportion of colorant that is present in the finished colored lead or colored chalk. It has been found that, surprisingly, the later introduction of the colorant means that a distinctly lower proportion of the colorant, based on the total mass of the colored lead, suffices for achieving a strong colored stroke which is comparable with that from hitherto known unfired colored leads.

To make not only differently colored strokes, but also different color effects, the colored lead contains, in a first variant, at least one water-soluble or alcohol-soluble dye as colorant, more particularly an anionic or cationic dye. In this connection, the dye is dissolved in water or alcohol or a mixture of water and alcohol in order to prepare the impregnation solution which serves for the introduction of the colorant into the lead base body and into which the sintered lead base body is then immersed. Alternatively, the colored lead contains at least one oil-soluble dye or one fluorescent dye as colorant.

If the colored lead contains water-soluble or alcohol-soluble dyes—also referred to hereinafter as water-soluble colored lead—the stroke made using such a colored lead is water-soluble. Thus, not only can it be removed from the writing, drawing or coloring pad using a rubber eraser, as is the case with a stroke made using a graphite lead, but it is also additionally possible to generate a watercolor effect when the stroke is treated with water and can thereby be distributed on the pad. The water can, for example, be applied using a brush or sponge.

If the colored lead contains oil-soluble dyes—also referred to hereinafter as permanent colored lead—it was possible to establish that, surprisingly, the stoke made using such a colored lead on the writing, drawing or coloring pad can be converted into an indelible, i.e., permanent, stroke. Also in the case of the permanent colored lead, a stroke that has been made can be removed from the writing, drawing or coloring pad without further treatment using a rubber eraser. However, if an indelible stroke is to be made, the stroke is treated with water or alcohol after it has been applied to the pad. As a result, the oil-soluble dyes are dissolved out of the stroke and penetrate deeper into the pad, more precisely into the paper fibers, with the result that it is no longer possible to erase the stroke.

If fluorescent dyes are used, strokes comparable with a highlighter can be made to highlight parts of text or the like.

Owing to impregnation of the colored lead in at least one lubricant, the colored lead becomes softer, with the result that the stroke behavior and the erasability of the lead are improved. The lubricant is added by impregnation of the sintered lead base bodies, i.e., the lubricants are likewise not already added to the lead base material. As a result, the above-described effect occurs satisfactorily, provided that altogether a proportion of from 1 to 20% by weight, more particularly a proportion of from 3 to 18% by weight, particularly preferably a proportion of from 5 to 16% by weight, of lubricant is present in the colored lead or colored chalk, and this in turn probably appears to be attributed to the lubricant being embedded less firmly in the binder/filler matrix. Here, the proportion of the lubricant is likewise based on the proportion of lubricant that is present in the finished colored lead or colored chalk.

Preferably present as lubricant(s) is/are at least one hydrophilic wax and/or at least one hydrophobic fatty or waxy substance, more particularly triglycerides of one or more fatty acids, a paraffin wax and/or a polyolefin wax. In this connection, the hydrophilic wax is used in order to prepare water-soluble colored leads and to achieve or to intensify the above-described effects. The further mentioned lubricants are also used in permanent colored leads.

If necessary, the colored lead can, moreover, contain further, customary additives, such as, for example, surfactants or emulsifiers, which are added to the lead base material in the preparation of the colored lead in order to facilitate the processability of the starting materials.

The following composition can thus be specified as the composition of the finished colored lead or colored chalk:

| a) | Sintered lead/chalk base body | 80.0 to 95.0% by weight |
|---|---|---|
| b) | Colorant | 1.5 to 4.0% by weight |
| c) | Lubricant | 7.0 to 15.0% by weight. |

The second-mentioned object is achieved with a pencil containing a colored lead having the above-described features. In this connection, the pencil has in particular a sheath composed of wood or composed of a wood plastic compound that encases the colored lead. Alternatively, the pencil is a mechanical pencil, for example a fine lead pencil provided with a colored lead.

The third-mentioned object is achieved by a process for preparing a colored lead or colored chalk. According to the process, a sintered chalk or lead base body is prepared from a lead or chalk base material containing at least one binder and one filler (step a)).

To obtain colored or color-giving chalks and/or leads, the sintered chalk or lead base bodies are, in a subsequent step, impregnated in a solution containing at least one colorant, more particularly an aqueous and/or alcohol-containing solution (step b)). To this end, the sintered chalk or lead base bodies are immersed into the solution containing the colorant. If a water-soluble colored lead is to be prepared, hydrophilic dyes are present as colorants. In the case of the preparation of a permanent colored lead, oil-soluble dyes are added to the solution as colorants. The following process parameter ranges can be specified for this first impregnation step, which is typically carried out in an autoclave:

| a) | Autoclave temperature | 40 to 60° C. |
|---|---|---|
| b) | Autoclave pressure | 0 to 9 kgf/mm² |
| c) | Impregnation time | 1 to 72 h. |

In a final step, the sintered, colored chalk or lead base bodies are impregnated in a solution containing at least one lubricant (step c)). To this end, the sintered, colored chalk or lead base bodies are immersed into the solution containing the lubricant. If a water-soluble colored lead is to be prepared, at least one hydrophilic wax is present as lubricant. In the case of the preparation of a permanent colored lead, water-insoluble lubricants, such as, for example, paraffin wax, polyolefin wax or oil, are added. The mechanical strength and the softness of the colored lead are predominantly improved or adjusted by the second impregnation step.

For the second impregnation step, which is likewise typically carried out in an autoclave, the following process parameters can be specified:

| a) | Autoclave temperature | 40 to 110° C. |
|---|---|---|
| b) | Autoclave pressure | 0 to 9 kgf/mm² |
| c) | Impregnation time | 1 to 72 h. |

The preparation of the sintered chalk or lead base body from the chalk or lead base material containing at least one binder and at least one filler, and also initially the preparation of the chalk or lead base material per se, contains in particular multiple steps. In a first step, the substances forming the chalk or lead base material, namely the at least one binder and the at least one filler, possibly with addition of water, are mixed and homogenized to form the lead or chalk base material (step a1)). This is done in particular in a high-speed mixer, it being possible to specify the following values as fundamental process parameters for the mixing procedure:

| a) | Rotational speed | 200 to 4000 rpm |
|---|---|---|
| b) | Temperature | 25 to 100° C. |
| c) | Mixing time | 20 to 80 min |
| d) | Cooling time | 10 to 30 min. |

Furthermore, it is possible to vary the type and arrangement of the stirrer and also the order of the addition of the starting materials.

In a further step, the lead or chalk base material is kneaded (step a2)). This is done in particular in a kneader and/or in a roller mill. The following values can be specified as fundamental process parameters for the kneading procedure in a roller mill (double roller):

| a) | Distance between rollers | 0.5 to 1.0 mm |
|---|---|---|
| b) | Number of passes | 2 to 4. |

Furthermore, it is possible to vary the relative speed between the rolls. If necessary, water is also added here.

Thereafter, the lead or chalk base material, for example in the form of a granular material or a pasty material, is extruded to form chalks and/or lead strands (step a3)). An extrusion rate of from 15 to 150 m/min can be specified as fundamental process parameter for the extrusion procedure. The rate is dependent on the desired diameter of the colored lead or colored chalk, wherein the diameter of a colored lead is to be typically between 0.3 and 6.0 mm and the diameter of a colored chalk is usually between 6 and 12 mm. Depending on the water content of the lead or chalk base material, it is further possible to work at different pressures.

In a further step, the extruded chalks and/or lead strands are dried at temperatures between 80 and 150° C. and for a time of between 250 and 300 min in order to remove in particular the water which was previously added and is present in the extruded chalks and/or lead strands (step a4)).

Subsequently, the dried chalks and/or lead strands are sintered in a nonoxidative atmosphere in order to strengthen the chalks and/or lead strands (step a5)). What has been found to be ideal here is a maximum temperature or end temperature between 600 and 1100° C. at a heating rate of from 5 to 50° C./min. After the sintering process, the chalk or lead base body of the colored lead or colored chalk is thus formed. The property profile of the colored leads can be substantially influenced by the temperature during the sintering procedure. It has become apparent that a high temperature leads to dense, i.e., less porous, and hard colored leads, the stroke of which has, however, a low color intensity. By contrast, the lower the temperature, the more porous and fragile the colored lead, but the more intense the color of its stroke. In the abovementioned temperature interval, the best results were achieved strength, stability and stroke behavior.

In the solution, the colorant is preferably present with a proportion of from 1 to 30% by weight, more particularly with a proportion of from 3 to 26% by weight, particularly preferably with a proportion of from 5 to 22% by weight.

Preferably, excess solvent, more particularly water or alcohol, that is present in the chalks and/or the lead strands after the impregnation (steps b) and c)) is removed in each case by means of centrifugation, with the result that the prepared colored lead contains no more solvent, i.e., more particularly no more water and no more alcohol. In this connection, a centrifugation time of about 15 min has been found to be sufficient in each case.

Table 1 below lists various compositions which are used as starting materials for preparing the lead base material, namely various fillers, mineral fillers, clay or boron nitride, and also a binder.

TABLE 1

| | Exemplary embodiments | | | | | | | |
|---|---|---|---|---|---|---|---|---|
| | 1 | 2 | 3 | 4 | 5 | 6 | 7 | 8 |
| Mineral filler[1] | 0.0 | 6.0 | 12.0 | 25.0 | 45.0 | 27.0 | 70.0 | 42.0 |
| Clay[2] | 21.0 | 17.0 | 42.0 | 27.0 | 4.0 | 38.0 | 16.0 | 4.0 |
| Boron nitride[3] | 65.0 | 71.0 | 34.0 | 36.0 | 46.0 | 20.0 | 0.0 | 46.0 |
| Binder[4] | 14.0 | 6.0 | 12.0 | 12.0 | 5.0 | 15.0 | 14.0 | 8.0 |
| Sum: | 100.0 | 100.0 | 100.0 | 100.0 | 100.0 | 100.0 | 100.0 | 00.0 |

The data are in percent by weight and indicate in each case the proportion of the individual substance in the lead base material.

Table 2 below lists exemplary embodiments for impregnation solutions for introducing the colorant into the sintered lead base body, which are used for producing differently colored leads.

TABLE 2

| | Blue colored lead | Red colored lead | Green colored lead | Pink colored lead | Yellow colored lead |
|---|---|---|---|---|---|
| Basic blue 007[5] | 12.3 | | | | |
| Basic yellow 037[6] | | | 6.2 | 5.8 | | 14.8 |
| Basic red 1:1[7] | | 15.3 | | | |
| Basic green 4/42000[8] | | | 15.7 | | |
| Basic red 1[9] | | | | 21.5 | |
| Solvent (alcohol)[10] | 87.7 | 78.5 | 78.5 | 78.5 | 85.2 |
| Sum: | 100.0 | 100.0 | 100.0 | 100.0 | 100.0 |

The data are in percent by weight and indicate in each case the proportion of the individual substance in the impregnation solution.

By means of impregnation solutions according to Table 2, in which cationic or alcohol-soluble dyes are used, it is possible to prepare water-soluble colored leads. Permanent colored leads are prepared by using impregnation solutions containing oil-soluble dyes or color pigments, for example Solvent Red CI 26100, Solvent Blue CI 61554 in similar proportions.

Table 3 lists three example formulations for an erasable, water-soluble colored lead and three example formulations for an erasable, permanent colored lead. The process parameters which were adjusted in the preparation of the colored leads A to F can be gathered from Table 4. The binder and the filler, containing here boron nitride in each case plus a further filler that is clay or kaolin, are first mixed and homogenized in a high-speed mixer in two stages and then kneaded in a roller mill. The lead base material obtained therefrom is extruded to form lead strands. To quicken the mixing and homogenization process, water is added and is evaporated up to a residual moisture of less than 2% by weight during the mixing procedure in the high-speed mixer, in the roller mill or in the extruder. The lead strands are subsequently dried and sintered, and so the sintered lead base body is finished. In two final impregnation procedures, the sintered lead base bodies are successively immersed into a solution containing the colorant and into a solution containing the lubricant, so that the colorant or the lubricant can penetrate into the pores of the sintered lead base body.

TABLE 3

| | Examples of colored leads | | | | | |
|---|---|---|---|---|---|---|
| | emplary embodiments | | | | | |
| | Erasable, water-soluble colored lead | | | Erasable, permanent colored lead | | |
| | A | B | C | D | E | F |
| Sintered lead base body (fillers/binder) | 86.4 | 83.2 | 89.2 | 85.0 | 88.8 | 93.0 |
| Lead base material: | | | | | | |
| Clay | 20.5 | 15.2 | 10.2 | 34.0 | 24.5 | 7.0 |
| Kaolin | 0.0 | 0.0 | 0.0 | 0.0 | 8.0 | 24.7 |
| Boron nitride | 55.7 | 58.3 | 72.1 | 40.0 | 49.1 | 56.3 |
| Binder | 10.2 | 9.7 | 6.9 | 11.0 | 7.2 | 5.0 |
| Dyes: | | | | | | |
| Hydrophilic dye[5),6),7),8),9)] | 1.6 | 1.2 | 1.0 | 0.0 | 0.0 | 0.0 |
| Oil-soluble dye[11] | 0.0 | 0.0 | 0.0 | 2.0 | 1.4 | 1.0 |
| Lubricant: | | | | | | |
| One or more hydrophilic waxes[12] | 1.0 | 2.0 | 2.0 | 0.0 | 0.0 | 0.0 |
| One or more hydrophobic waxes[13),14)] | 11.0 | 13.6 | 7.8 | 13.0 | 9.8 | 6.0 |

The data are in percent by weight.

After each impregnation procedure, alcohol or water used in the impregnation solutions is removed by centrifugation. Thus, water used during the preparation and alcohol or water present in the impregnation solutions are not present or are hardly present in the finished colored lead.

TABLE 4

Process parameters for the colored leads according to exemplary embodiments A to F:

| | Exemplary embodiments | | | | | |
|---|---|---|---|---|---|---|
| | Erasable, water-soluble colored lead | | | Erasable, permanent colored lead | | |
| Process parameters | 1 | 2 | 3 | 4 | 5 | 6 |
| High-speed mixer | | | | | | |
| Rotational speed, stage 1 [rpm] | 200-600 | 200-600 | 200-600 | 200-600 | 200-600 | 200-600 |
| Rotational speed, stage 2 [rpm] | 3000-4000 | 2500-3500 | 2500-3500 | 3000-4000 | 2500-3500 | 2500-3500 |
| Temperature range, stage 1 [° C.] | 25-50 | | | | | |
| Temperature range, stage 2 [° C.] | 50-100 | | | | | |
| Mixing time, stage 1 [min] | 5-10 | | | | | |
| Mixing time, stage 2 [min] | 15-75 | | | | | |
| Cooling time [min] | 10-30 | 10-30 | 10-30 | 10-30 | 10-30 | 10-30 |
| Mixing in roller mill | | | | | | |
| Distance between rollers [mm] | 0.5 | 0.5 | 1.0 | 0.5 | 0.5 | 1.0 |
| Number of passes | 4 | 3 | 2 | 4 | 3 | 2 |
| Extrusion of the lead base material | | | | | | |
| Extrusion rate [m/min] | 15-150 | 15-150 | 15-150 | 15-150 | 15-150 | 15-150 |
| Drying | | | | | | |
| Temperature [° C.] | 150 | 100 | 80 | 150 | 100 | 80 |
| Time [min] | 300 | 250 | 250 | 300 | 250 | 250 |
| Sintering | | | | | | |
| Temperature [° C.] | 600 | 800 | 1100 | 750 | 850 | 1020 |
| Impregnation in solution containing the colorant | | | | | | |
| Autoclave temperature [° C.] | 60 | 55 | 45 | 60 | 55 | 40 |
| Autoclave pressure [kgf/mm²] | 9 | 5 | 0 | 9 | 5 | 0 |
| Impregnation time [h] | 1 | 2 | 72 | 1 | 2 | 72 |
| Centrifuge time [min] | | | 15 | | | |
| Impregnation in solution containing waxy or fatty substance | | | | | | |
| Autoclave temperature [° C.] | 40 | 100 | 120 | 40 | 100 | 110 |
| Autoclave pressure [kgf/mm²] | 0 | 5 | 9 | 0 | 8 | 9 |
| Impregnation time [h] | 72 | 2 | 1 | 72 | 2 | 1 |
| Centrifuge time [min] | 15 | | | | | |

Of the exemplary embodiments for a water-soluble colored lead, a water-soluble, erasable colored lead or a pencil containing such a colored lead having a composition according to exemplary embodiment A has, with 20.5% by weight, the highest proportion of the filler clay, which is present in the colored lead in addition to boron nitride as filler. Owing to a high proportion of clay or kaolin, the colored lead becomes fundamentally harder, and this at first results in a weaker stroke or a stroke that is less intense in color. However, exemplary embodiment A showed that this can be compensated for with a higher total proportion of colorants, namely 1.6% by weight of water-soluble dyes, with the result that the stroke made using such a colored lead nevertheless exhibits a high color intensity as well as an excellent watercolorability upon treatment with water. Furthermore, the colored lead was sintered at a temperature of only 600° C., resulting in the porosity of the lead base body being increased and the colored lead being altogether softer, resulting in the color intensity likewise being increased.

A water-soluble, erasable colored lead or a pencil containing such a colored lead having a composition according to exemplary embodiment B substantially differs from the colored lead according to exemplary embodiment A by a lower proportion of clay (15% by weight) and by a higher proportion of lubricants present altogether (15.6% by weight), more particularly a great amount of introduced hydrophilic wax. This improves in particular the watercolorability of the colored lead.

A water-soluble, erasable colored lead or a pencil containing such a colored lead having a composition according to exemplary embodiment C has a content of boron nitride as filler that is distinctly higher in comparison with the two previous exemplary embodiments A and B, namely 82.3% by weight. By contrast, the proportion of clay as filler is distinctly reduced (10.2% by weight). As a result, the colored lead becomes softer and the stroke has very easy erasability.

A permanent, erasable colored lead or a pencil containing such a colored lead having a composition according to exemplary embodiment D is mainly distinguished by a high proportion of binder, in this case 11.0% by weight. As a result, the lead base body exhibits a large porosity, and the colored lead is soft and makes a stroke which exhibits a high color intensity. Moreover, the high proportion of lubricants, altogether 13.0% by weight, ensures a comfortable application behavior on the writing, drawing or coloring pad.

A permanent, erasable colored lead or a pencil containing such a colored lead having a composition according to exemplary embodiment E has a higher proportion of boron nitride in comparison with the previous colored lead, and as a result, this yields a colored lead, the strokes of which exhibit an improved erasability. Furthermore, a third filler, namely kaolin, is added.

In the case too of the permanent, erasable colored lead or a pencil containing such a colored lead according to exemplary embodiment F, three fillers are used, namely clay, kaolin and boron nitride. Altogether, the colored lead according to exemplary embodiment F has the highest total proportion of fillers and the highest proportion of boron nitride, and as a result, the colored lead exhibits in turn a very good erasability. This is not substantially impaired even by the low proportion of binder of only 5.0% by weight and the high sintering temperatures of about 1050° C., which fundamentally increase the hardness of the colored lead.

Product Names/Manufacturers

1) Talc (CAS No. 14807-96-6; for example Talmag PR-2, Magnesita); kaolin (CAS No. 1332-58-7; for example SAZ003, Imerys) or calcium carbonate (CAS No. 471-34-1; for example NAT EDK 400, EDK Mineracao)

2) Clay (CAS No. 1332-58-7; for example Karlich, Kärlicher Ton and Scham. Mann. & Co.)

3) Boron nitride (CAS No. 10043-11-5; for example Très BN PUPH500, Saint Gobain)

4) Binder (CAS No. 9004-32-4; for example Denvercell, Denver Especialidades Químicas)

5) CAS No. 2390-60-5; for example Spectra Victoria Pure Blue BO, Spectra Colors Corporation 6) CAS No. 6358-36-7; for example Spectrazine Yellow WFA, Spectra Colors Corporation 7) CAS No. 989-38-8; for example Spectra Rhodamine 6GDN Conc, Spectra Colors Corporation 8) CAS No. 569-64-2; for example Malakite Green, Polycrom Química do Brasil 9) CAS No. 989-38-8; for example Rhodamine 6GDN 500%, ChemColour's GmbH 10) CAS No. 64-17-5; for example Cerba Destilaria de Álcool LTDA 11) Solvent Red 23, CI 26100; Solvent Blue 35, CI 61554

12) CAS No. 68439-49-6; for example Cosmowax CS80-PA-RB, Croda or Genapol T800P, Clariant)

13) CAS No. 61789-97-7; for example hydrogenated tallow, A. Azevedo Ind. e Com. de Óleos Ltda 14) Montan wax/CAS No. 73138-45-1; for example Waradur ESL, Voelpker

The invention claimed is:

1. An erasable, sintered colored lead for writing, drawing and coloring implements or a colored chalk, comprising:
a sintered lead or chalk base body formed from lead or chalk base material containing at least one binder with a proportion of from 4 to 17% by weight and at least one filler with a proportion of from 25 to 99% by weight;
at least one colorant;
at least one lubricant, said sintered lead or chalk base body being impregnated with said least one colorant and said at least one lubricant, said colorant being present in the colored lead or the colored chalk with a proportion of from 0.1 to 10% by weight; and
said at least one filler is selected from the group consisting of boron nitride, a mineral filler, kaolin, talc, calcium carbonate, and clay being present in said lead or chalk base material.

2. The colored lead or the colored chalk according to claim 1, wherein said boron nitride is present in said lead or chalk base material with a proportion of not more than 90% by weight.

3. The colored lead or the colored chalk according to claim 1, wherein said mineral filler is present in said lead or chalk base material with a proportion of not more than 90% by weight.

4. The colored lead or the colored chalk according to claim 2, wherein said clay is one of at least two fillers and said clay is present in said lead or chalk base material with a proportion of from 1 to 60% by weight.

5. The colored lead or the colored chalk according to claim 1, wherein said at least one filler is present in said lead or chalk base material with a proportion of at least 50% by weight.

6. The colored lead or the colored chalk according to claim 1, wherein said colorant is present in the colored lead or the colored chalk with a proportion of from 0.5 to 7% by weight.

7. The colored lead or the colored chalk according to claim 1, wherein said colorant is selected from the group consisting of at least one water-soluble dye, at least one alcohol-soluble dye, at least one oil-soluble dye and at least one fluorescent dye.

8. The colored lead or the colored chalk according to claim 1, wherein said lubricant is present in the colored lead or the colored chalk with a proportion of from 1 to 20% by weight.

9. The colored lead or the colored chalk according to claim 1, wherein said lubricant is selected from the group consisting of at least one hydrophilic wax, at least one hydrophobic fatty or waxy substance, triglycerides of at least one fatty acid, a paraffin wax, a polyolefin wax, and an oil.

10. The colored lead or the colored chalk according to claim 1, wherein said boron nitride is present in said lead or chalk base material with a proportion of not more than 75% by weight.

11. The colored lead or the colored chalk according to claim 1, wherein said mineral filler is present in said lead or chalk base material with a proportion of not more than 75% by weight.

12. The colored lead or the colored chalk according to claim 2, wherein said clay is one of at least two fillers and said clay is present in said lead or chalk base material with a proportion of from 1 to 45% by weight.

13. The colored lead or the colored chalk according to claim 1, wherein said at least one filler is present in said lead or chalk base material with a proportion of at least 80% by weight.

14. The colored lead or the colored chalk according to claim 1, wherein said colorant is present in said colored lead or colored chalk with a proportion of from 0.8 to 5% by weight.

15. The colored lead or the colored chalk according to claim 1, wherein said lubricant is present in said colored lead or colored chalk with a proportion of from 5 to 16% by weight.

16. A pencil, comprising:
a colored lead, containing:
a sintered lead or chalk base body formed from a lead or chalk base material containing at least one binder with a proportion of from 4 to 17% by weight and at least one filler with a proportion of from 25 to 99% by weight;

at least one colorant;

at least one lubricant, said sintered lead or chalk base body being impregnated with said least one colorant and said at least one lubricant, said colorant being present in the colored lead or colored chalk with a proportion of from 0.1 to 10% by weight; and said at least one filler is selected from the group consisting of boron nitride, a mineral filler, kaolin, talc, calcium carbonate, and clay being present in said lead or chalk base material; and a sheath composed of a wood or wood plastic compound.

17. A process for preparing a colored lead or colored chalk, which comprises the following process steps of:

preparing a sintered chalk or lead base body from a chalk or lead base material containing at least one binder with a proportion of from 4 to 17% by weight and at least one filler with a proportion of from 25 to 99% by weight;

impregnating the sintered chalk or lead base body in a solution containing at least one colorant, wherein the colorant is present in the solution with a proportion of from 1 to 30% by weight; and impregnating the sintered chalk or lead base body in the solution with at least one lubricant.

18. The process according to claim 17, wherein a preparation of the sintered chalk or lead base body further comprises the following steps of:

mixing and homogenizing the at least one binder and the at least one filler to form the lead or chalk base material;

kneading the lead or chalk base material;

extruding the lead or chalk base material to form chalks and/or lead strands;

drying the chalks and/or the lead strands; and after the drying step, sintering the chalks and/or the lead strands.

19. The process according to claim 17, wherein the colorant is present in the solution with a proportion of from 3 to 26% by weight.

20. The process according to claim 18, which further comprises removing excess solvent that is present in the chalk and/or the lead strands after an impregnation is removed in each case by means of centrifugation.

* * * * *